United States Patent [19]

Triplett

[11] 3,850,055

[45] Nov. 26, 1974

[54] FASTENER TOOL

[75] Inventor: Lee Triplett, Magna, Utah

[73] Assignee: Expando Products Company, Salt Lake City, Utah

[22] Filed: Sept. 21, 1973

[21] Appl. No.: 399,435

[52] U.S. Cl. .................................. 81/52.4 A, 81/56
[51] Int. Cl. ................................ B25b, B25b 17/00
[58] Field of Search .................. 81/55, 56, 52.4, 66

[56] References Cited
UNITED STATES PATENTS

| | | | |
|---|---|---|---|
| 1,002,310 | 9/1911 | Procunier | 81/52.4 R |
| 2,501,386 | 3/1950 | Gibbs | 81/52.4 R |
| 2,789,597 | 4/1957 | LaTorre | 81/55 |
| 2,959,994 | 11/1960 | Kile | 81/64 |

Primary Examiner—James L. Jones, Jr.

[57] ABSTRACT

A fastener tool for securing members together with a fastener that has an outer member to be solidly held and an inner member to be turned. The tool has a fixed outer housing with automatic gripping means therein and an inner rotating member configured to engage the inner member of the fastener and to be power driven through a torque clutch.

3 Claims, 4 Drawing Figures

PATENTED NOV 26 1974 3,850,055
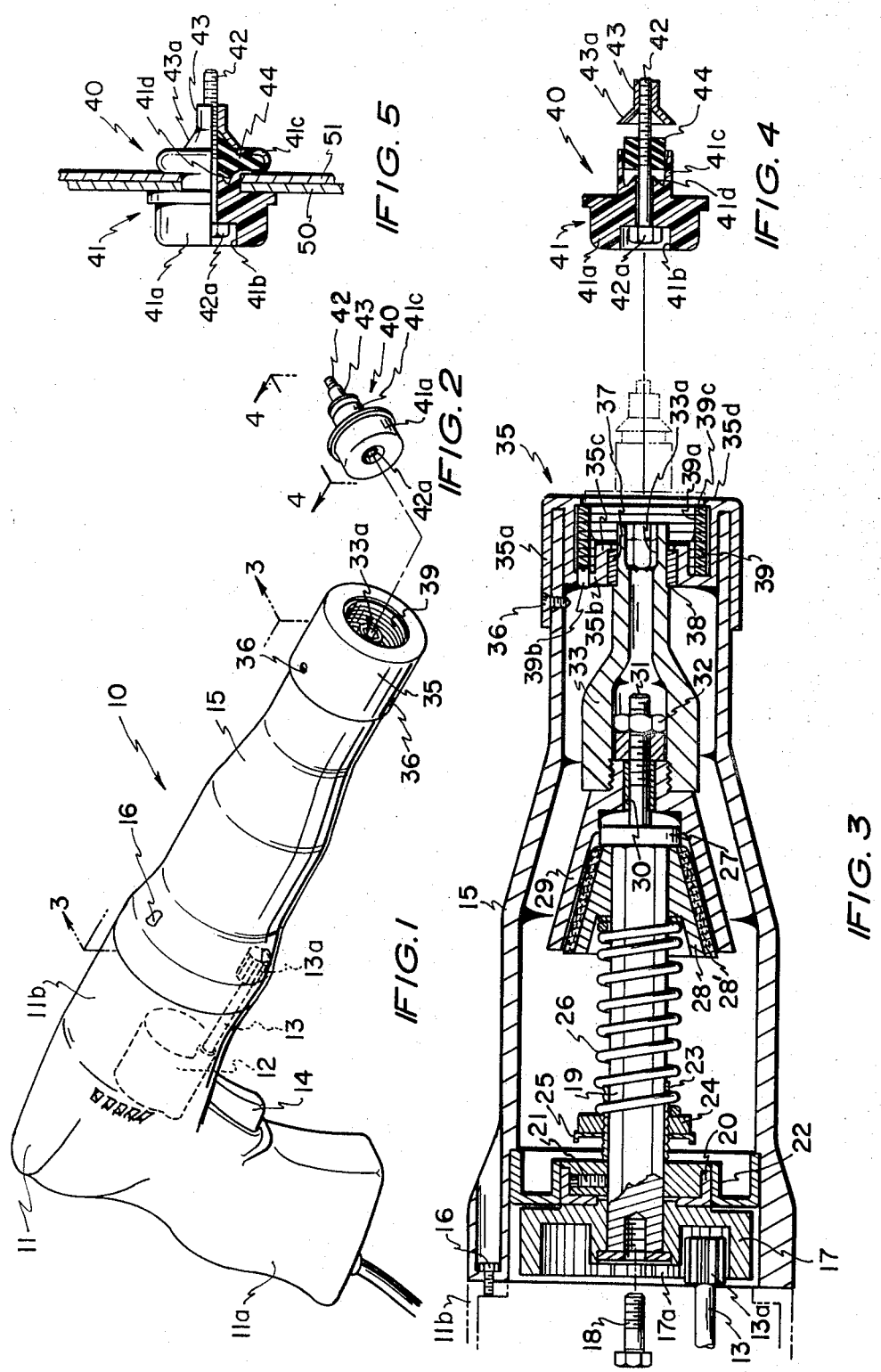

FASTENER TOOL

BRIEF DESCRIPTION OF THE INVENTION

1. Field of the Invention

This invention relates to tools for securing members together.

2. Prior Art

Quick operating devices for holding members together have been known to have such fasteners wherein an outer member is secured, while an inner member is turned to cause a clamping action from opposite ends of the fastener. Such a fastener is shown, for example, in my co-pending application for U.S. Pat. Ser. No. 275,714, filed July 27, 1972. As shown in the aforesaid application, the inner and outer members of the fastener each have hexagon shaped heads and the fastener tool also disclosed in the said application has an internally configured hexagon outer holding member and an internally configured hexagon inner member for use in manipulating the fastener. Fasteners of the type described are particularly useful in permanently clamping together overlapping panels used in building construction or other structures where it is desirable that the fastener can be fully manipulated from one side of the structures being clamped.

Both the fastener and the fastener tool disclosed in my aforesaid application for patent have proven very useful. However, it is still desired that means be provided for even more rapidly securing objects together, and it is desired that the costs of producing the fastener be reduced to the extent possible.

SUMMARY OF THE INVENTION

It is a principal object of the present invention to provide a powered tool that can be used to rapidly manipulate fasteners having an outer member to be secured and an inner member to be turned.

Another object is to provide such a tool that is arranged to engage a circular outer member, so that time is not spent in aligning an outer holding member of the tool with an outer member to be secured of the fastener.

Still other objects are to provide a tool that can be used to manipulate a low cost fastener of the type described and that can be used to apply a predetermined torque force to the fastener.

Principal features of the invention include a housing that is adapted to fit onto and become an integral part of a motor powered drive unit; an outer gripping member that will fully encircle and grip a circular outer member of a fastener; and an inner member that will engage an inner member of the fastener and that is powered to apply a predetermined torque force to the inner member while the outer gripping member immobilizes the outer member of the fastener.

Additional objects and features of the invention will become apparent to those skilled in the art from the following detailed description and claims, taken with the accompanying drawings.

THE DRAWINGS

FIG. 1 is a front perspective view of a fastener tool of the invention;

FIG. 2, a rear perspective view of a preferred fastener used with the tool of FIG. 1;

FIG. 3, a fragmentary, enlarged, vertical section, taken on the line 3—3 of FIG. 1, with the fastener shown in phantom therein; and FIG. 4, an enlarged, vertical section, taken on the line 4—4 of FIG. 2.

DETAILED DESCRIPTION

Referring now to the drawings:

In the illustrated preferred embodiment, the fastener tool of the invention, shown generally at 10, includes a housing 11 having a handle 11a and a barrel 11b. A motor, shown generally at 12, in phantom, (FIG. 1) is positioned within the housing and an output shaft 13 (FIGS. 1 and 2) from the motor has a spur gear 13a on the end thereof remote from the motor. A conventional trigger switch 14 for the motor 12 is mounted in the usual fashion to extend through the housing for actuation.

An extension housing 15 forms a continuation of barrel 11b and the extension housing is secured to the barrel by bolts 16. An internally toothed ring gear 17 surrounds and is in meshing engagement with spur gear 13a and the hub 17a of the ring gear is secured by bolt 18 to one end of a shaft 19. The ring gear 17 is within the extension housing 15 and a bearing 20 is secured to shaft 19 by set screws 21 and fits within a bushing 22 that is press fitted tightly within the housing extension.

An exteriorly threaded sleeve 23 is pressed onto shaft 19 and a spring adjustment nut 24 and a locking nut 25 are threaded onto the sleeve 23. A coil spring 26 surrounds shaft 19 and has one end abutting nut 24 and the other end abutting a conical clutch plate 28 that is slidably telescoped onto the shaft 19. The spring 26 forces the conical clutch plate 28 against a stop member 27, formed on the end of shaft 19 opposite to the ring gear 17, and biases a clutch lining 28' on the clutch plate 28 against an oppositely facing convex clutch plate 29. Clutch plate 29 is journaled, on a bushing 30, that surrounds a post 31 projecting from stop member 27 in a direction opposite to shaft 19. Sufficient head room is provided between the stop member 27 and the clutch plate 29 to allow the spring 26 to continually move lining 28' against clutch plate 29 as the lining wears. A nut 32 is threaded onto post 31 to hold the clutch plate and the bushing 30 on the post. A socket extension 33 is threaded onto the clutch plate 29 and projects to the free end of the extension housing 15 before terminating in a hexagon shaped socket 33a that serves as an inner gripping member of the tool. The socket 33a is thus adapted to receive an inner member or head of the fastener to be manipulated, as will be hereinafter described in detail.

An outer gripping member, shown generally at 35, comprises a housing 35a that telescopes over the free end of the extension housing 15 and that is fixed thereon by set screws 36. The housing 35a fits over the end of the extension housing and extends inwardly to form a ring shaped cup 35b. The innermost wall 35c of the cup has a bushing 37 press fitted therein and the bushing engages a shoulder 38 in the socket extension and allows the forward end of the socket extension to both reciprocate and revolve therewithin.

A coiled spring 39, made of spring steel or other suitable material, having a rectangular cross section and wound to have a flat inner coil surface 39a, has one end 39b securely anchored through a slot provided therefor at the bottom of the cup and the coil at the other end 39c abutting a lip 35d formed on the housing 35a. The lip 35d projects only partially over the spring coil so that a fastener inserted therein can contact the flat inner coil surface. The spring 39 is coiled in the direction of rotation of the socket 33a, so that as the socket is turned to rotate the inner member of the fastener being manipulated, the frictional engagement of the outer member of the fastener with the flat inner coil surface of the spring will tighten the coil, thereby causing it to grip the outer member. The greater the force tending to turn the outer member, the greater the holding force on the outer member, since the spring is merely coiled more tightly. However, once the rotational force applied through the fastener to the spring is released, even a very slight reverse turning of the housing 35a and the spring anchored thereto will expand the spring to allow for immediate release of the outer member of the fastener.

While it will be apparent that other types of fasteners can be used, for example, a fastener such as is shown in my aforementioned co-pending application for U.S. Pat. Ser. No. 275,714, a fastener of the type shown generally at 40 is preferred.

Fastener 40 comprises a ferrule 41 having an integral round head 41a, that is recessed at 41b; a barrel 41c; and a compression guide 41d. The ferrule is preferably made of one piece of durable, easily molded and non-conductive material such as a strong plastic or Nylon. A bolt 42 extends centrally through the ferrule and has its head 42a positioned within the recessed portion of head 41a of the ferrule. A compression member 43 is threaded onto the other end of bolt 42. The compression member is flared at one end portion 43a to form an expansion member receiving area. The flared portion can be continuous, as shown, or can be formed of separated individual segments (not shown) with the configuration of petals. In either case, an expansion member 44 closely surrounds the bolt 42 and has one end arranged to fit into the flared portion 43a, while the other end extends tightly into the barrel 41c to be engaged by the compression guide 41d.

In manipulating fastener 40, the head 41a is immobilized and the head 42a is turned. Compression member 43 is held against rotation with bolt 42 by its frictional engagement with expansion member 44, which is held against rotation by frictional engagement with barrel 41c. Consequently, rotation of the bolt 42 in the proper direction, will move the compression member 43 onto the bolt and towards head 42a. Such movement forces the expansion member further into barrel 41c until it engages the compression guide 41d, which projects from head 41a along the bolt 42. Continued axial movement of the compression member will then cause the expansion member to expand between the barrel and the compression member and then to outwardly buckle the barrel. The buckled barrel, shown best in FIG. will then be flared outwardly to prevent withdrawal of the fastener 40 from a wall, board, or other object or objects through which the barrel is inserted before manipulation of the fastener. The head 42a can be turned until the expanding expansion member is compressed as tightly as desired between the buckled barrel portions and the compression member.

The head 41a of ferrule 41 is round and is fully surrounded by the coils of spring 39 so that no corners or other irregularities are necessary as a means by which the head can be grasped to be turned. Because the head 41a is fully engaged by the surrounding spring, the torque is uniformly applied and the head can be constructed of softer material than could be otherwise used. Thus, it becomes possible to make the head out of the same material used for the barrel 41c, and when the fastener is manipulated to lock members together, the ferrule is the only portion of the fastener in contact with the fastened members. Thus, if the members fastened are metal building components, for example, prefabricated building panels, the ferrule can be of a non-conductive material and no electrolysis will occur.

In using the tool of the invention to manipulate a fastener 40, the fastener is positioned within the tool such that head 42a is within socket 33a, and head 41a is positioned within the coiled spring 39. The barrel of the fastener is inserted through objects to be locked, for example, panels 50 and 51, FIG. 5, and trigger switch 14 is operated to start motor 12. When motor 12 (which may be either AC or DC powered) is energized, output shaft 13 and spur gear 13a are rotated. Gear 13a drives gear 17 to turn shaft 19 and clutch plate 28. Lining 28' of clutch plate 28 is held against clutch plate 29 by spring 26 and the frictional engagement with the lining rotates clutch plate 29 with clutch plate 28 and turns the socket 33a and the bolt head 42a positioned therein. Rotation of the bolt head 42a momentarily turns the head 41a, but such rotation of the head 41a is stopped and the head is immobilized as soon as the coil spring tightens thereon. Thereafter, head 42a will continue to rotate until the fastener is secure, as previously described.

The clutch assembly provides for setting the torque to be applied through head 42a as desired. Thus, when the pre-set torque has been applied spring 26 will yield to allow the clutch plate 28 and lining 28' to slip with respect to clutch plate 29. The pressure at which the spring will yield is determined by the positioning of nuts 24 and 25 and can be varied in accordance with the torque to be applied.

Although a preferred embodiment of my invention has been herein described, it is to be understood that the present disclosure is by way of example and that variations are possible, without departing from the scope of the hereinafter claimed subject matter, which subject matter I regard as my invention.

I claim:

1. A fastener tool comprising
   a housing;
   a motor in said housing;
   an inner gripping means for engaging an inner head of a fastener;
   means connecting said inner gripping means to said motor,
      whereby operation of said motor rotates said inner gripping means, said means including clutch means having a pair of clutch plates biased into driving engagement one with the other;
   switch means carried by the housing for starting and stopping said motor means; and
   an outer gripping means carried by said housing and surrounding said inner gripping means, said outer gripping means being adapted to engage and hold an outer member of a fastener that is received and turned by said inner gripping member and including a spring coiled in the direction of rotation of the inner gripping means, said spring surrounding and spaced from the inner gripping means and having one end fixed with respect to said housing.

2. A fastener tool as in claim 1, wherein
the inner gripping means is positioned for rotation within the spring of the outer gripping means and further including
means for holding the inner gripping means against reciprocation within the housing; and wherein
the clutch plates comprise a fixed cone member secured to and rotatable with the inner gripping means and a cooperating movable cone member having a surface adapted to engage the fixed cone member and reciprocable but held against rotation on a shaft drivingly coupled to the motor.

3. A fastener as in claim 2, wherein
the means biasing the clutch plates into driving engagement with one another comprises an expansion spring surrounding the shaft drivingly coupled to the motor, one end of said spring engaging the movable cone member and the other end engaging a nut threaded on said shaft.

* * * * *